(12) United States Patent
Woods et al.

(10) Patent No.: US 6,822,052 B2
(45) Date of Patent: Nov. 23, 2004

(54) TOUGHENED CYANOACRYLATE ADHESIVES CONTAINING ALKENE-ACRYLATE COPOLYMERS AND METHOD FOR PRODUCTION

(75) Inventors: John Woods, Farmington, CT (US); Susanne Morrill, West Hartford, CT (US)

(73) Assignee: Henkel Corporation, Rocky Hills, CT (US)

( * ) Notice: Subject to any disclaimer, the term of this patent is extended or adjusted under 35 U.S.C. 154(b) by 111 days.

(21) Appl. No.: 10/239,139
(22) PCT Filed: May 24, 2001
(86) PCT No.: PCT/US01/16933
§ 371 (c)(1),
(2), (4) Date: Sep. 20, 2002
(87) PCT Pub. No.: WO02/00801
PCT Pub. Date: Jan. 3, 2002

(65) Prior Publication Data
US 2003/0208002 A1 Nov. 6, 2003

(51) Int. Cl.[7] .......................... C08L 23/08; C08L 31/06; C08L 33/14; C08L 51/06
(52) U.S. Cl. ....................... 525/295; 525/259; 525/302; 525/309; 525/310; 524/850
(58) Field of Search ................................. 525/295, 259, 525/302, 309, 310; 524/850

(56) References Cited

U.S. PATENT DOCUMENTS

| | | | |
|---|---|---|---|
| 2,467,927 A | 4/1949 | Ardis | 260/465.4 |
| 3,183,217 A | 5/1965 | Serniuk et al. | 260/85.5 |
| 3,254,111 A | 5/1966 | Hawkins et al. | 260/465.4 |
| 3,316,227 A | 4/1967 | Gerber | 260/88.7 |
| 3,963,772 A | 6/1976 | Takeshita | 260/485 |
| 4,102,945 A | 7/1978 | Gleave | 260/879 |
| 4,440,910 A | 4/1984 | O'Connor | 525/295 |
| 4,444,933 A | 4/1984 | Columbus et al. | 524/292 |
| 4,477,687 A | 10/1984 | Finney | 136/229 |
| 4,533,422 A | 8/1985 | Litke | 156/307.3 |
| 4,556,700 A | 12/1985 | Harris et al. | 526/209 |
| 4,560,723 A | 12/1985 | Millet et al. | 524/486 |
| 4,622,414 A | 11/1986 | McKervey | 560/61 |
| 4,636,539 A | 1/1987 | Harris et al. | 523/214 |
| 4,695,615 A | 9/1987 | Leonard et al. | 526/194 |
| 4,718,966 A | 1/1988 | Harris et al. | 156/331.2 |
| RE32,889 E | 3/1989 | Litke | 523/212 |
| 4,837,260 A | 6/1989 | Sato et al. | 524/261 |
| 4,855,461 A | 8/1989 | Harris | 549/348 |
| 5,340,873 A | 8/1994 | Mitry | 525/10 |
| 5,994,464 A | 11/1999 | Ohsawa et al. | 525/85 |

FOREIGN PATENT DOCUMENTS

WO    83 02450    7/1983    ............. C08L/9/02

*Primary Examiner*—James J. Seidleck
*Assistant Examiner*—Olga Asinovsky
(74) *Attorney, Agent, or Firm*—Steven C. Bauman

(57) ABSTRACT

A toughened cyanoacrylate adhesive composition including a cyanoacrylate monomer and an elastomeric copolymer soluble in the monomer, the copolymer being the reaction product of an olefin $C_{2-20}$ and a (meth)acrylate ester. The invention further discloses novel elastomeric copolymers which do not contain additives or functional groups which can interfere with the cure rate or stability of the adhesive composition in which they are included. Benefits of the copolymers include improved toughness of the cured adhesive composition as measured by Dynamic Mechanical Analysis.

31 Claims, 6 Drawing Sheets

TOUGHENED CYANOACRYLATE ADHESIVES CONTAINING ALKENE-ACRYLATE COPOLYMERS AND METHOD FOR PRODUCTION

FIELD OF THE INVENTION

The present invention is directed generally to toughening copolymer additives such as alkene-(meth)acrylate ester copolymer additives which when incorporated into adhesive compositions, such as cyanoacrylate adhesive compositions, increase the toughness of the adhesive upon cure.

BRIEF DESCRIPTION OF RELATED TECHNOLOGY

Cyanoacrylates are highly reactive monomers that undergo rapid anionic polymerization reactions initiated by minute amounts of basic or nucleophillic species. It is generally known that small amounts of acidic or electrophilic species will retard or inhibit this reaction. As a consequence of their extreme anionic reactivity, commercial formulations of cyanoacrylate monomers usually contain small amounts of acidic stabilizers that are intended to be sufficient to ensure a reasonable shelf-life for the product, but not so excessive as to render the product inactive when it is applied to the surface of a substrate. If too little stabilizer is added, the product will be prone to premature polymerization and if too much is added it will be less active and function less effectively as an adhesive. The commercially available ethylene/methyl acrylate toughening additives, are also problematic in this respect because they often contain small amounts of materials, e.g. acids, that result in the over- or under-stabilization of the total adhesive composition.

While cyanoacrylate adhesives are useful for many applications, they inherently lack sufficient toughness and are often too brittle for certain applications. Attempts have been made to eliminate post-cure embrittlement, through the addition of various types of additives, and particularly toughening additives, which generally have elastomeric properties. For example, copolymers formed from the copolymerization of acrylate esters with olefins have been added as modifiers to cyanoacrylate adhesive compositions to impart toughening properties and lower brittleness of the cured product. In particular, ethylene-methyl acrylate copolymers are sold commercially by DuPont under the trademark Vamac and have been used as toughening additives for cyanoacrylate adhesives.

Loctite Corporation's U.S. Pat. No. 4,440,910 discloses a cyanoacrylate adhesive composition which contains a monomeric ester of 2-cyanoacrylic acid and about 0.5% to about 20% by weight of an elastomeric polymer selected from the group consisting of elastomeric copolymers of a lower alkene monomer and (i) acrylic acid esters, (ii) methacrylic acid esters or (iii) vinyl acetate. Acrylic rubbers disclosed in this patent include ethylene-methyl acrylates under the trade name Vamac N-123 and Vamac B-124. These rubbers, as well as other Vamac products, for example, Vamac-G and Vamac-D, either contain free carboxylic acid functionalities and/or impurities which cause a slowing of the cure rate of cyanoacrylate adhesive compositions or a decrease in shelf-life when incorporated therein.

It is generally accepted in the reactive adhesive art that increased toughness and lower brittleness is achievable if toughening additives can be solvated by the uncured reactive monomer and subsequently undergo a phase separation from the adhesive matrix during the curing process.. The ability of these additives to be solvated by the cyanoacrylate monomer results in a demonstrable phase separation of the additive during polymerization of the cyanoacrylate monomer. Phase separation is generally accepted as a necessary condition for increased adhesive toughness. One problem with some commercially available ethylene-methyl acrylate copolymers is that they are only partially solvated by cyanoacrylate monomers. Thus, when cyanoacrylate adhesives which incorporate these commercially available toughening additives are cured, polymerization-induced phase separation, and hence toughening, is not optimized.

Compatibility of the toughening additive with the cyanoacrylate monomer is an important feature. For example, as noted above the toughening agent itself should not be so acidic that it significantly slows down the cure rate, and not so basic or nucleophilic that it cures prematurely. Known commercially available ethylene-acrylate copolymers are also problematic in this respect because they often contain trace amounts of carboxylic functional groups, which are known to cause a slowing of the cure rate of the adhesive In addition, these functionalities contribute to reduced activity upon storage.

Commercially available toughening copolymers used in cyanoacrylate adhesive formulations are generally prepared from olefin monomers having three carbons or less. In general, for formation of the copolymers, olefins with greater than three carbons are difficult to polymerize with alkyl acrylate esters by free radical polymerization due to their low reactivity toward free radicals and their increased tendency to undergo a chain transfer rather than a propagation reaction.

U.S. Pat. No. 3,183,217 discloses a process for copolymerizing an alkene with a (meth)acrylic acid ester. The '217 patent discloses higher alkenes such as 1-hexene, as well as lower alkenes, as being useful materials for copolymerization with (meth)acrylic acid esters. This patent discloses admixing the alkenes with (meth)acrylic acid esters with equimolar amounts of a Lewis acid per mole of the polar vinyl monomer, i.e., (meth)acrylic acid ester, and copolymerizing the resulting admixture in the presence of a free radical initiator, under anhydrous conditions and at a temperature of about $-78°$ to about $175°$ C. Using this method and the ratio of reactants disclosed therein, however, limits the amount of olefin which can be incorporated into the final copolymer product.

It is generally desired to have higher levels of olefin relative to (meth)acrylic acid ester incorporated into the copolymer product in order to avoid an unwanted plasticization of the cured adhesive. If the olefin incorporated into the copolymer product is too low, a plasticization rather than toughening of the cured adhesive occurs, which would be manifested by an incomplete or absence of phase separation of the copolymer from the adhesive matrix during cure. Moreover, the optimal amount of olefin for incorporation into the copolymer for adhesive toughening may change depending on the cyanoacrylate monomer used in the adhesive composition.

It would therefore be desirable to have a means of varying the olefin content in the olefin/(meth)acrylate ester copolymers in accordance with the cyanoacrylate monomer chosen in order to control the balance between toughening and plasticization. Thus, there is a need for a process of polymerization of an alkene (olefin) with a (meth)acrylate ester wherein the reaction conditions can be varied in order to increase the olefin content and vary the molecular weight of the resulting copolymer to achieve adhesive toughening.

It would also be beneficial to achieve toughening without the reactivity and stabilization difficulties associated with commercial toughening copolymer additives. Therefore, there is a need for curable adhesives containing toughening copolymer additives with improved solubility in cyanoacrylate monomers, as well as copolymers which do not contain trace amounts of interfering functional groups, additives, or stabilizers that can shorten the shelf life of the adhesive monomer or reduce its activity.

It would therefore be desirable to provide toughening copolymers which have been synthesized de novo from olefin and (meth)acrylate ester monomers by a method wherein the resulting copolymer products are free of interfering functional groups, additives or stabilizers. Moreover, it would be desirable to provide a method for modifying existing commercial olefin (meth)acrylate and olefin/alkenoic acid copolymers in order to eliminate acidic functional groups which are known to affect the cure rate of cyanoacrylate monomers, and by so doing make them suitable for use as toughening additives of cyanoacrylate adhesives.

SUMMARY OF THE INVENTION

The present invention provides new copolymer toughening additives which are substantially free of acidic functionality, and acidic or basic impurities and which are the reaction of an olefin monomer containing between 2 to 20 carbon atoms (olefin $C_{2-20}$) and a (meth)acrylate ester. These copolymer toughening additives are made by new processes. One process includes copolymerizing a (meth) acrylic ester with an olefin $C_{2-20}$ by (i) admixing a (meth) acrylic ester, a greater than equimolar amount of a Lewis acid per mole of the (meth)acrylic ester, a free radical initiator and an olefin $C_{2-20}$; (ii) and heating the resultant admixture at a temperature from about 60 to about 80° C. for a time sufficient to permit copolymerization of the ester with the olefin. It may, under certain circumstances, be desirable to use a solvent to facilitate this reaction. Zinc chloride is an example of a desirable Lewis acid useful in the present invention. The molar ratio of olefin to (meth)acrylic ester is desirably from about 0.1 to about 10.

An additional process for preparation of copolymer toughening additives includes esterification of existing olefin/(meth)acrylate or olefin/alkenoic acid copolymers containing acidic functional groups to allow conversion of the undesirable, interfering acidic functionalities into esters, thus making the copolymers more suitable for use as additives for cyanoacrylate adhesives. The esterification process includes reacting the copolymer with an alcohol in the presence of a catalytically effective amount of an acid catalyst, at a temperature of about 50 to about 180° C. and in the presence of a solvent which is capable of dissolving the copolymer and which is generally suitable for esterifications. The reaction is allowed to proceed for a time sufficient to allow conversion of the interfering carboxylic acid functionalities into esters. It is usually desirable to remove the acid catalyst after the reaction is complete by precipitating the copolymer in a solvent in which the catalyst is soluble and the copolymer is insoluble, e.g. methanol.

The present invention also provides cyanoacrylate adhesive compositions which are toughened by copolymers substantially free of acidic functional groups and acidic or basic impurities that can result in the over- or under-stabilization of the cyanoacrylate adhesive composition.

In another aspect of the invention there is provided a toughened cyanoacrylate adhesive composition which contains at least one cyanoacrylate monomer and a copolymer toughening additive soluble in the cyanoacrylate monomer, which copolymer toughening additive is substantially free of acidic functionalities and acidic or basic impurities and is the reaction product of an olefin $C_{2-20}$ and (meth)acrylate ester.

In another aspect of the present invention there is provided a copolymer toughening additive which is at least partially, and desirably fully, soluble in a cyanoacrylate monomer and that, upon cure of the cyanoacrylate adhesive composition, undergoes a phase separation characteristic of an improvement in toughness. The present invention further provides a method for preparing the copolymer toughening additive which allows for copolymerization of alkenes ($C_{2-20}$) with (meth)acrylate esters and provides a means to vary the degree of incorporation of the alkene into the copolymer additive. Moreover, the present invention seeks to provide a method of preparing a toughened adhesive composition that contains, as one of its components, the copolymer toughening additives herein described.

The present invention further relates to a process for preparing cyanoacrylate adhesive compositions which when cured exhibit increased toughness as compared to the same or similar adhesive compositions without the copolymer toughener additives. This process includes combining a cyanoacrylate monomer with a toughening additive which is the copolymer reaction product of an olefin $C_{2-20}$ and a (meth)acrylate ester; subjecting the combined cyanoacrylate monomer and copolymer to conditions sufficient to allow the monomer to at least partially, and desirably fully, solvate the copolymer. On curing, the adhesive composition undergoes a phase separation of the copolymer additive from the polycyanoacrylate matrix.

A further aspect of the present invention includes providing a composition useful for toughening various types of adhesive compositions, and particularly cyanoacrylate adhesive compositions, which composition includes a copolymer toughening additive which is substantially free of acidic functionalities and acidic or basic impurities and which is the reaction product of an olefin $C_{2-20}$ and a (meth)acrylate ester.

Finally, the present invention provides a process for sealing or adhering surfaces which includes the steps of applying the toughened adhesive composition of the present invention to a substrate surface, placing the surface in abutting relationship with another surface and permitting the adhesive composition to cure therebetween.

DETAILED DESCRIPTION OF THE INVENTION

Figure 1:
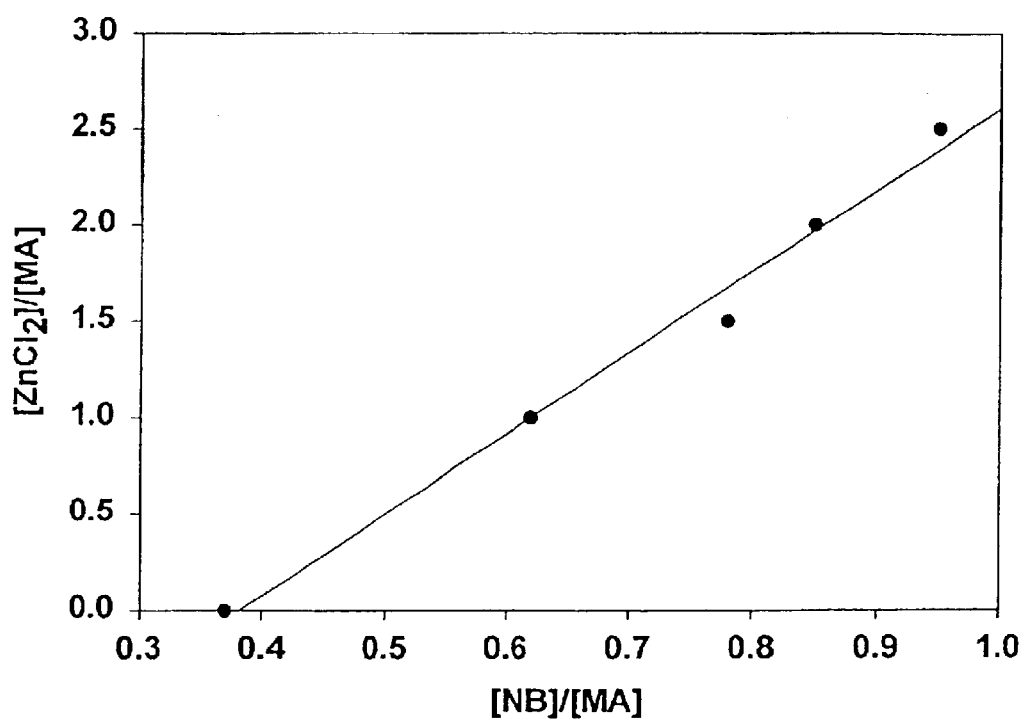
FIG. 1 is a graph showing the dependence of the norbornene concentration in the copolymer formed from norbornene and methyl acrylate on the concentration of zinc chloride in the feed.

The cyanoacrylate adhesive compositions of the present invention may employ one or more monomeric esters represented by formulas 1, 2, and 3 below:

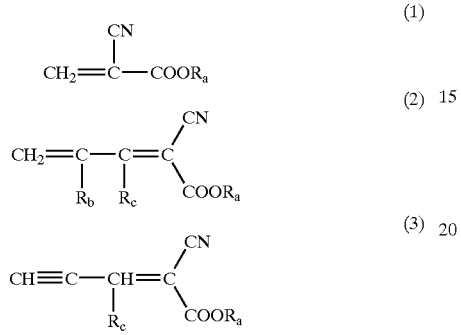

wherein $R_a$ represents a $C_{1-16}$ alkyl, alkoxyalkyl, alkylhalide, alkenyl, cyclohexyl, phenyl or furfuryl group. $R_b$ may be hydrogen, a $C_{1-5}$ alkyl, phenyl or halogen and $R_c$ may be hydrogen or methyl. The $R_a$, $R_b$ and $R_c$ groups can contain any linkages or substituents which do not adversely affect the monomer in the performance of its intended function in the cyanoacrylate adhesive compositions. For example, the substituents should not adversely affect the stability or reactivity of the adhesive composition. Useful cyanoacrylate esters include methoxethyl cyanoacrylate and 2-chloroethyl cyanoacrylate. In the adhesive composition of the present invention, the esters of cyanoacrylate can be used singly or in combination. Typically, a single ester is used having formula (1), which is selected from $C_1$ to about $C_5$ alkyl, allyl and cyclohexyl esters of alpha-cyanoacrylate. The most desirable esters are methyl-alpha-cyanoacrylate or ethyl-alpha-cyanoacrylate. Methods of preparing the monomeric esters of alpha-cyanoacrylate are known in the art, such as those described in U.S. Pat. Nos. 2,467,927 and 3,254,111. Useful cyanoacrylate monomers having formulas (2) or (3) include 1-cyano-1-carbethoxy butadiene-1,3,1-cyano-1-carbethoxy-3-cholorbutadiene-1,3 and 1-cyano-1-carbethoxy-butene-1-yne-3. These compounds and their method of making are disclosed in U.S. Pat. No. 3,316,227.

The cyanoacrylate adhesive compositions of the present invention contain at least one cyanoacrylate monomeric ester and at least one copolymer toughening additive substantially soluble in the cyanoacrylate monomer. The copolymer toughening additive is desirably an elastomer material which is substantially free of acidic functionalities and acidic or basic impurities and which is the reaction product of an olefin $C_{2-20}$ and a (meth)acrylate ester. Desirably, the copolymers of this invention are completely soluble in cyanoacrylate monomer and exhibit little or no phase separation once fully dissolved in the uncured cyanoacrylate monomer. On curing, the adhesive composition undergoes a phase separation of the copolymer additive from the polycyanoacrylate matrix. This is associated with an increase in toughness of the cured adhesive.

Olefins $C_{2-20}$ which are useful in making the toughening additives of the present invention are represented by the following monofunctional olefin structures (4), (5), or (6):

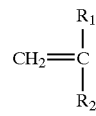

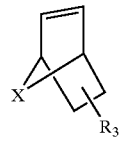

where $R_1$ and $R_2$ may be the same or different and are independently selected from H, $C_1$–$C_{15}$ alkyl, cycloalkyl, alkyl ether, substituted or unsubstituted, linear or branched and $R_3$ may be H, $C_1$–$C_{10}$ alkyl, cycloalkyl, alkyl ether, substituted or unsubstituted, linear or branched, X may be =O, S or —$(CH_2)_n$—, where n may be =0–6. It is required that the substituents are neutral with respect to the reactivity of cyanoacrylates, i.e. non-acidic and non-basic.

The (meth)acrylate esters useful in making the toughening additives of the present invention are monofunctional (meth) acrylate monomers represented by structure (7):

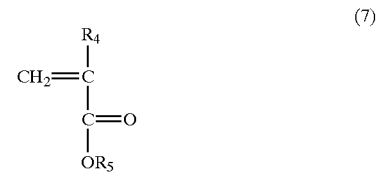

where $R_4$ may be H or $CH_3$ and $R_5$ may be $C_1$–$C_{18}$ alkyl, cycloalkyl, alkyl ether, aryl, alkaryl, substituted or unsubstituted, linear or branched. It is required that the substituents do not interfere with anionic polymerization of the cyanoacrylate monomer. Desirably, the (meth)acrylate ester used for the chain reaction which forms the copolymer toughening additive is methyl acrylate. Other useful (meth) acrylate esters include, but are not limited to, ethyl, propyl, isopropyl, n-butyl, sec-butyl, isobutyl, t-butyl, pentyl, amyl, hexyl, 4-methyl pentyl, octyl methoxy, ethyl and cyclohexyl acrylates.

In one desired embodiment, the copolymer of the present invention is obtained by a polymerization reaction of an olefin $C_{2-20}$ having at least six carbon atoms and a (meth) acrylate ester. In one desirable embodiment, the olefin $C_{2-20}$ may be 1-hexene or norbornene, and the (meth)acrylate ester may be methyl acrylate. For example, the reaction of norbornene and methyl acrylate, shown below, produces the copolymer toughening additive corresponding to the alternating structures shown However, random or block copolymers of these reactants may also be produced.

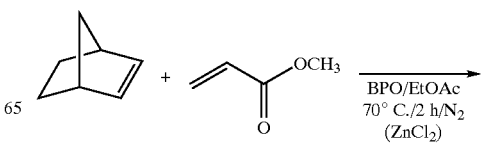

-continued

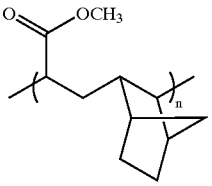

The copolymer toughening additives of the present invention include olefin/(meth)acrylate copolymers [poly(alkene-co-alkyl acrylate) or poly (alkene-co-alkyl methacrylate)] comprising repeat units of the substructure (8) shown below and one or more of the substructures (9), (10), or (11) shown below in random, alternating or block sequences. The mole ratios of (8) to (9), (10) and/or (11) may be varied from 0.1 to 10.0. The molecular weights of the copolymers may be varied from about 2,000 to 2,000,000 and are preferably in the range of 20,000 to 200,000.

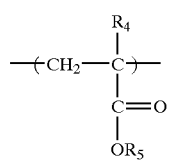
(8)

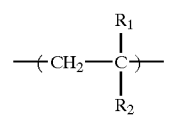
(9)

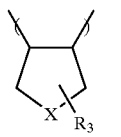
(10)

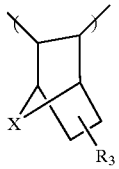
(11)

In the above substructure examples, $R_1$ through $R_5$ are as already defined. Desirably, the (meth)acrylate ester used for the condensation reaction which forms the copolymer toughening additive is methyl acrylate.

The copolymer toughening additives of the present invention are at least partially soluble in a cyanoacrylate monomer. As already described, it is desirable to have a fully soluble rather than partially soluble toughening additive. Norbornene-methyl acrylate and hexene-methyl acrylate copolymers are examples of toughening additives which are readily soluble in monomers of ethyl 2-cyanoacrylate. It is also important that the copolymer toughening agent be insoluble in the corresponding cured cyanoacrylate adhesive composition. Both norbornene-methyl acrylate and hexene-methyl acrylate undergo a phase separation upon polymerization (cure) of an ethyl 2-cyanoacrylate monomer, characteristic of toughening, as determined by DMA analysis which provides one of the most effective means of determining the degree of toughening potential known in the art.

The molar ratio of olefin to acrylate in the copolymers of the present invention can affect the characteristics of the copolymer as well as the properties and characteristics of an adhesive in which it is used as an additive. The present invention provides an effective means of controlling the degree of incorporation of olefin in the copolymer in order to produce a series of copolymers with different characteristics that can be optimized for particular applications. The present invention employs a method of forming copolymer toughening additives which uses the addition of varying amounts of a Lewis acid, e.g. zinc chloride, as a means of controlling the molar ratio of alkene to acrylate in the resultant copolymer toughening additives and in promoting the incorporation of higher levels of alkene content into the resultant copolymer toughening additives.

Olefin-acrylate copolymers of the present invention may be synthesized from olefin and (meth)acrylate ester monomers by two methods which are outlined below; a stirred reactor method and a sealed tube method. Each of these methods was performed under anhydrous conditions and, conveniently, under ambient pressure. Moreover, each of these methods requires addition of a Lewis acid, e.g. $ZnCl_2$, and an initiator of free radical polymerization, e.g. benzoyl peroxide. The reaction temperatures are in the range of 60° C. for the stirred reactor method and 80° C. for the sealed tube method, with reaction times varying from 3 to 24 hours, respectively. In general, the sealed tube method provided a higher yield of copolymer, as compared to the stirred reactor method. It is an advantage of these methods that no special purification of the copolymer products is necessary. The copolymer solution is simply washed with distilled water to remove zinc chloride prior to drying. This is in contrast to the methods used to produce similar commercially available copolymers which have a comparatively high degree of impurity or undesirable moieties.

In particular, the present invention provides an improved process for copolymerizing a (meth)acrylic ester with an olefin $C_{2-20}$. This process includes the steps of admixing a (meth)acrylic ester, a greater than equimolar amount of a Lewis acid per mole of the (meth)acrylic ester, a free radical initiator and an olefin $C_{2-20}$, and heating the admixture at a temperature from about 60 to about 80° C. for a time sufficient to permit copolymerization of the ester with the olefin. The mole ratio of the olefin to the (meth)acrylic ester in the feed is desirably from about 0.1:1 to about 10:1, most desirably 1:1 to about 10:1. This molar ratio range has been found to give copolymer toughening additives useful in the present invention.

One Lewis acid particularly suitable for practicing this invention is $ZnCl_2$. Suitable olefins for purposes of this invention are those containing groups promoting the release of electrons at the double bond. In one embodiment, the olefin has at least six carbon atoms. Desirable olefins to be used for copolymerization with the (meth)acrylic ester include hexene and norbornene. Other useful olefins include, but are not limited to, pentene, 4-methyl pentene, octene, isooctene, 2-ethylhexene, 2-methyl pentene, decene and nonene.

As previously mentioned, commercially available polymeric toughening agents used with cyanoacrylate adhesives, including ethylene/methyl acrylate copolymers sold under the trademark Vamac by DuPont, are problematic in that they contain additives or functional groups which can affect the stability and fixture time of the adhesive. For example, Table 5 below shows that the effect of removing the interfering carboxylic acid functionality in commercial Vamac G via esterification by a process provided by the present invention is to significantly enhance the reactivity of the cyanoacrylate adhesive and improve its fixture time.

In particular, the invention provides a process for esterification of a commercial olefin/(meth)acrylate copolymer or olefin/alkenoic acid copolymer, which eliminates interfering acid functionalities, thus making the copolymers suitable as toughening additives for cyanoacrylate adhesives. The process includes reacting the copolymer with an alcohol in the presence of a catalytically effective amount of an acid catalyst at a temperature of about 50 to about 180° C. and in the presence of a solvent which is capable of dissolving the copolymer and which is generally suitable for esterifications for a time sufficient to convert carboxylic acid functionalities on the commercial copolymers into ester functionalities. It is usually desirable to remove the acid catalyst after the reaction is complete by precipitating the copolymer in a solvent in which the catalyst is soluble and the copolymer is insoluble, e.g. methanol.

In one embodiment of the esterification process of the present invention the olefin/(meth)acrylate copolymer is an ethylene/methyl acrylate copolymer, such as commercially available Vamac G, or a propylene/methyl acrylate copolymer. One useful alcohol is n-butanol, although other alcohols may be useful. However, attempts to esterify a Vamac G copolymer by the esterification process of the present invention were unsuccessful when the alcohol used in the reaction was methanol. In one embodiment, the acid catalyst is methane sulfonic acid (MSA). Other useful acid catalysts can include toluene sulfonic acid, sulfuric acid, phosphoric acid, as well as others generally known in the art to be useful for esterifications, provided they can be effectively removed from the esterified copolymer so as not to affect the cure rate or stability of cyanoacrylate adhesive compositions into which the esterified copolymer is added as a toughener.

Suitable solvents for use in practicing the esterification process of the present invention are those capable of forming an azeotrope with water which can also effectively dissolve the commercial copolymer. These include, but are not limited to, benzene, tolulene, xylene, and high-boiling ethers such as methyl tert butyl ether. Where tolulene is the solvent, it is desirable that the temperature of the reaction be about 100 to about 120° C.

The copolymers of the present invention are an improvement over commercially available toughening agents in that they do not contain interfering additives or interfering functional groups. Instead, they are extremely compatible with the cyanoacrylate monomer, affecting neither the storage stability of the adhesive nor the reactivity of the cyanoacrylate monomer. Stability tests performed on cyanoacrylate adhesive compositions containing the hexene/methyl acrylate copolymer toughening additives of the present invention exhibited significant improvement over the same adhesive compositions containing certain commercially available Vamac products. Stability tests performed on cyanoacrylate adhesive compositions containing the norbornene/methyl acrylate copolymer toughening additives of the present invention also exhibited significant improvement over the same adhesive compositions containing certain commercially available Vamac products.

The copolymer toughening additive is present in amounts of about 0.5 to about 20% by weight of the cyanoacrylate adhesive composition. Desirably, the copolymer toughening additive is present in amounts of about 1.5 to about 15% by weight of the cyanoacrylate adhesive composition. It is most desired that the copolymer be present in amounts of about 5 to about 15% by weight of the cyanoacrylate adhesive composition.

Figure 4:
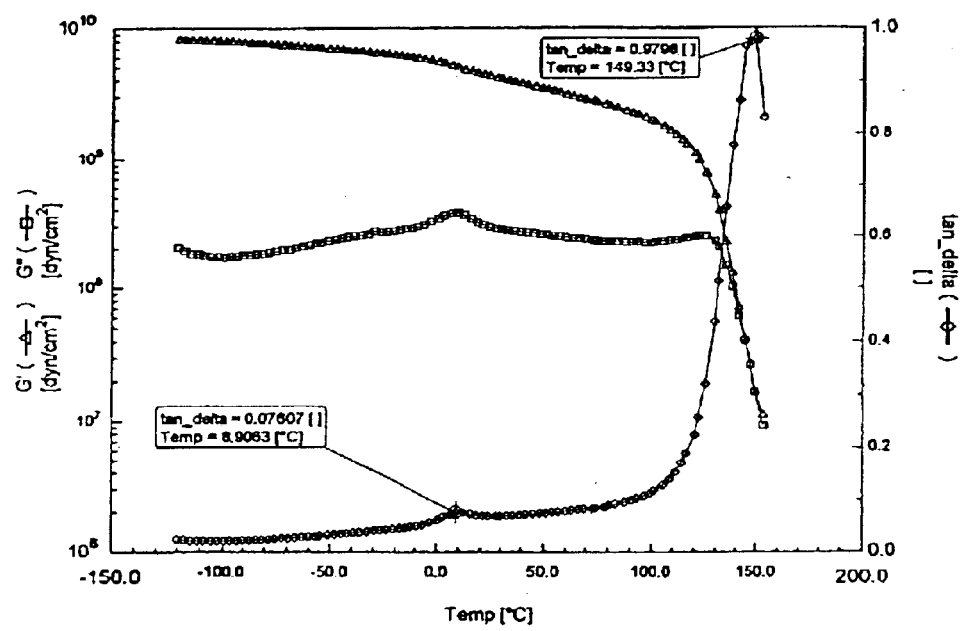
FIG. 4 is a DMA trace of photocured PECA containing 5% poly(hexene-co-methyl acrylate) where the mole ratio of hexene to methyl acrylate is 0.27 (sample #2).
Figure 5:
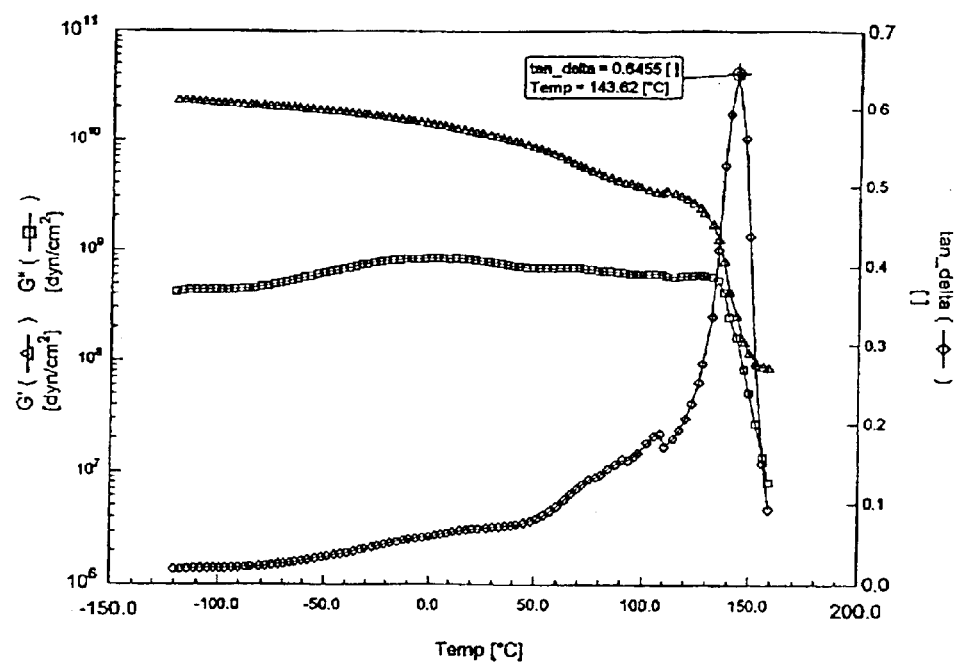
FIG. 5 is a DMA trace of photocured PECA containing 5% poly(hexene-co-methyl acrylate) where the mole ratio of hexene to methyl acryl 0.21 (sample #1).
Figure 6:
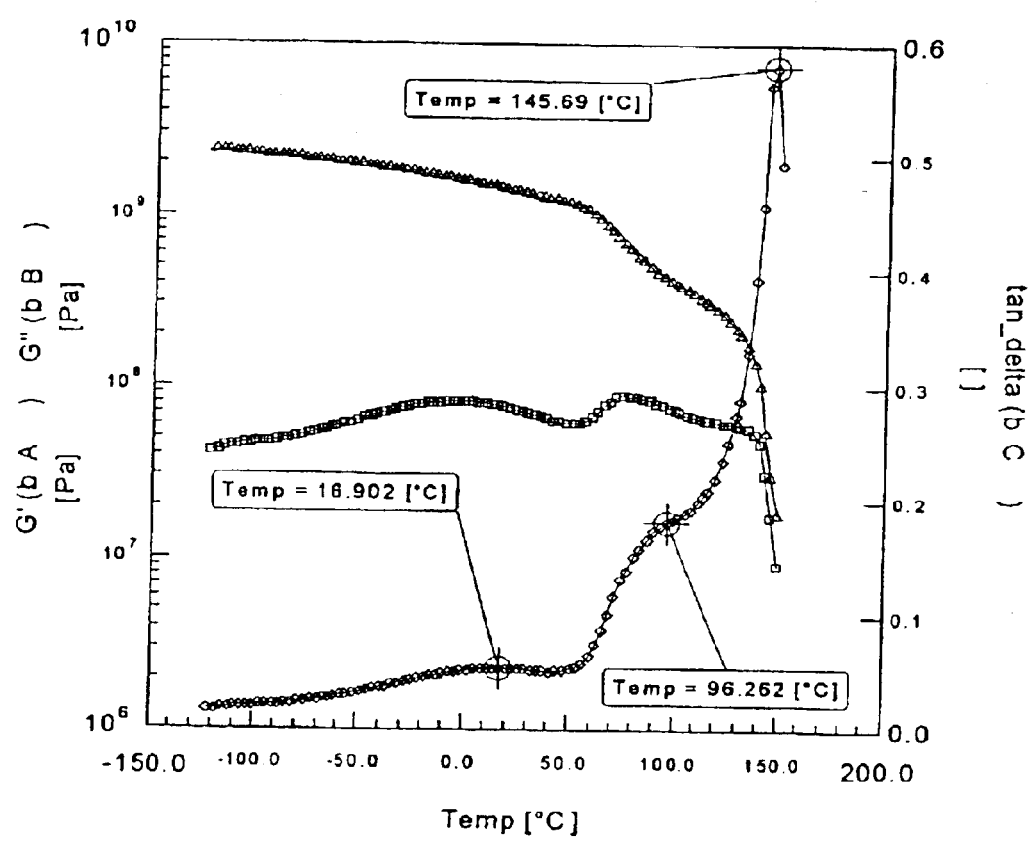
FIG. 6 is a DMA trace for UV cured CA film containing 8% poly(norbornene-co-methyl acrylate) where the molar ratio of norbornene to methyl acrylate in the copolymer is 0.37 (sample #N2).

It is an aspect of the toughened cyanoacrylate adhesive compositions of the present invention that upon cure of the cyanoacrylate monomer component, the copolymer toughening additive undergoes a polymerization-induced phase separation. FIGS. 4–6 below show the presence of a dispersed phase of the inventive toughening copolymer particles in a cured cyanoacrylate adhesive composition. This determination was made by Dynamic Mechanical Analysis (DMA), generally known to be a good indicator of a phase separated polymer morphology, when there is a difference in glass transition temperature ($T_g$) between the phases. Generally, phase-separated toughening particles have a low glass transition temperature relative to the polymeric cyanoacrylate adhesive in which they are dispersed. As can be seen from FIG. 4 of the present invention, DMA analysis indicated that the hexene-methyl acrylate copolymers made in accordance with the present invention (which have a hexene to methyl acrylate mole ratio of 0.27) had a $T_g$ of about 9° C., as compared with 149° C. for the cured cyanoacrylate polymer. This difference in Tg is indicative of their potential as toughening agents for adhesives. Furthermore, when DMA analysis was performed on a polymeric adhesive film containing the inventive norbornene-methyl acrylate copolymer toughening additives (having a norbornene to methyl acrylate mole ratio of 0.37), as shown in FIG. 6, a shoulder appeared in the scan at 96° C., which was not observed in scans of the same polymeric adhesive without the copolymer toughening adhesive. The relative size of this shoulder compared to the alpha transition at 146° C. for the matrix of the polymeric adhesive indicates a high degree of toughening potential for the copolymer.

The copolymer toughening additives of the present invention have as an advantage over commercially available copolymer additives of being substantially free of acidic functionalities and acidic or basic impurities. Desirably, the inventive copolymer toughening additives are the reaction product of an olefin $C_{2-20}$ and a (meth)acrylate ester. In one embodiment, the olefin $C_{2-20}$ is ethylene or propylene. In another embodiment, the olefin has at least six carbon atoms. One desirable (meth)acrylate ester is methyl acrylate. Other (meth)acrylate esters, however, may be employed. One desirable olefin useful in the present invention is 1-hexene. The reaction product of 1-hexene and methyl acrylate forms a particularly useful copolymer toughening agent. Where the olefin in the copolymer is 1-hexene and the cyanoacrylate monomer is ethyl cyanoacrylate, it is desired that the mole ratio of olefin to (meth)acrylate ester is at least 0.25 or greater. It is believed that a threshold concentration of hexene in the copolymer is needed to achieve the benefits of toughening from this particular copolymer. For example, DMA analysis performed on adhesive films containing hexene-methyl acrylate copolymers, as shown in FIGS. 4–5, suggested that when the mole ratio of hexene to methyl acrylate was 0.21, plasticization was prevalent, whereas when the same mole ratio was 0.27, a phase separation of the copolymer occurred, as indicated by the beta transition at 9° C., which is associated with toughening. Thus, the relative concentrations of the non-polar olefin and polar acrylate components of the copolymer control the compatibility of the copolymer in polycyanoacrylate. Copolymers having relatively high olefin contents are insoluble in the polymerized cyanoacrylate monomer and toughen cyanoacrylate polymers, whereas copolymers having relatively high acrylate contents are soluble in the polymerized cyanoacrylate monomer and plasticize materials to which they are added. Furthermore, the threshold concentration of olefin necessary for toughening may differ for each cyanoacrylate monomer or monomer blend.

As described above, the reaction product of 1-hexene and methyl acrylate forms a particularly useful copolymer toughening agent. This is further indicated by data presented in Example 7 which show results of fracture toughness tests performed on photocured adhesive films containing hexene-methyl acrylate copolymers. The results show a significant improvement in fracture toughness of the formulation containing the olefin-acrylate copolymer of this invention, when compared with a formulation that does not contain any copolymer.

One desirable copolymer toughening additive is the reaction product of norbornene and methyl acrylate. When the molar ratio of norbornene to methyl acrylate in the copolymer was 0.37, DMA analysis indicated a high degree of toughening potential for the copolymer, as shown in FIG. 6, based on the presence of the shoulder at 96° C. when the cyanoacrylate monomer was ethyl cyanoacrylate.

Another desirable copolymer toughening additive of the present invention which is free of acid functionalities and acidic or basic impurities, is the reaction product of ethylene or propylene and methyl acrylate. As described, the present invention provides a process for esterifying commercial olefin/(meth)acrylate copolymers, such as the ethylene/methyl acrylate copolymer Vamac G, which results in the elimination of the carboxylic acid functionalities which interfere with the cure rate of cyanoacrylate adhesives. Thus, the present invention includes ethylene/methyl acrylate and propylene/methyl acrylate toughening copolymers suitable for use as additives for cyanoacrylate adhesive compositions.

While the free radical initiator used for formation of the copolymers of the present invention is desirably benzoyl peroxide, a diacyl peroxide, other peroxy initiators known in the art may be useful. These include, but are not limited to the following: diacyl peroxides such as dilauroyl peroxide; dialkyl peroxides such as di-t-butyl peroxide and dicumyl peroxide; ketone peroxides such as methylethyl ketone peroxides; peresters which readily hydrolyze, e.g., t-butyl peracetate, t-butyl perbenzoate, di-t-butyldiperphthalate; and peroxycarbonates, i.e., reaction products of isocyanates and hydroperoxides. Another useful class of peroxy initiators are the organic hydroperoxides such as cumene hydroperoxide, methyl ethyl ketone hydroperoxide, and t-butyl hydroperoxide. Moreover, other free-radical initiators may be useful that do not require the presence of peroxide compounds, e.g. azonitriles or succinic acid.

One (meth)acrylic ester useful for preparing toughening copolymers of the present invention is methyl acrylate, although other acrylates as previously described may be useful.

The inventive process for preparing a toughened adhesive composition includes the steps of combining the cyanoacrylate monomer with the copolymer toughening additive, and subjecting the combined ingredients to conditions sufficient to allow the monomer to at least partially, and desirably fully solvate the copolymer toughening additive. In one embodiment, the olefin $C_{2-20}$ which is copolymerized with a (meth)acrylate ester has at least six carbon atoms. In another embodiment, the olefin $C_{2-20}$ can have three carbons or less. For example, the copolymer additive can be the commercially obtained reaction product of ethylene and methyl acrylate which has been modified by the esterification process provided by the present invention to remove acidic functionalities that can interfere with the reactivity of the cyanoacrylate monomer. It is an aspect of the foregoing process that upon cure of the cyanoacrylate monomer the solvated copolymer undergoes a phase separation associated with a toughening of the adhesive composition.

It is desirable that during the step of combining the ingredients of the cyanoacrylate adhesive composition, the copolymer be present in amounts of about 5 to about 15% by weight of the cyanoacrylate adhesive composition. For purposes of this invention, useful particle sizes of the phase-separated copolymer in the cured cyanoacrylate adhesive will generally be in the range of about 0.2 microns to about 200 microns, desirably 2–20 microns.

In addition to the above named ingredients, the adhesive composition of the invention may include an inhibitor of anionic or free radical polymerization. The anionic inhibitor can include sulfur dioxide, sulfur trioxide, nitric oxide, hydrogen fluoride, organic sultone inhibitors, boron trifluoride and methane sulfonic acid, which are all well known in the art. It is an embodiment of this invention that inhibitors of anionic polymerization be present at about 0.0001 to about 0.1% of the adhesive composition. Free radical inhibitors may include hydroquinones or quinones which are present at about 0.0005 to about 10% of the adhesive composition.

Apart from the incorporation of initiators and polymerization inhibitors in the compositions, it is also known and well within the contemplation of the present invention to incorporate other additives to modify the chemical and physical characteristics of the compositions. These additives include viscosity modifying agents, dyes, inert fillers and plasticizers.

The invention further includes a method for sealing or adhering surfaces. The method includes the steps of applying, to a substrate the surface the toughened cyanoacrylate adhesive composition of the present invention, placing the surface in an abutting relationship with another substrate surface and permitting the composition to cure. Pressure may or may not be applied to the bond line. The toughened cyanoacrylate adhesives of the present invention generally contain an inhibitor of anionic or free-radical polymerization. When placed on a substrate to be bonded and exposed to atmospheric and surface moisture in so doing, cure generally occurs in a short period of time, usually in less than two minutes.

The following examples illustrate the present invention.

EXAMPLE 1

Syntheses of Olefin-Acrylate Copolymers

The olefin-acrylate copolymers of the present invention were prepared by free-radical copolymerization of olefin and acrylate monomers or by esterification of copolymers. These copolymers were free of detectable acidic functionality or impurities. The polymerization reaction was performed by either of two methods, viz., in a stirred reactor or in a sealed tube. The methods are described below for the synthesis of poly(1-hexene-co-methyl acrylate) by copolymerization of 1-hexene and methyl acrylate and the esterification of a commercially available ethylene-methyl acrylate elastomer, Vamac G, with n-butanol. The procedures may be employed to prepare other copolymers by using different olefin and acrylate comonomer reactants in the polymerization reaction or by using other olefin-acrylate elastomers and alcohols in the esterification reaction.

Stirred Reactor Method. A 200-ml resin reaction flask was fitted with a condenser, thermocouple with temperature controller, magnetic stirrer and an oil bath. To the flask was added 39.0 g (0.465 moles) of 1-hexene, 20.0 g methyl acrylate (0.233 moles) and 80 ml ethyl acetate. The mixture was stirred and 0.295 g of benzoyl peroxide (0.5% by weight of monomers) and 47.5 g (0.35 moles) of zinc chloride were added. The latter was added gradually; the mixture was stirred for several minutes to dissolve the zinc chloride. A gentle stream of nitrogen was blown over the mixture then it was heated to about 60–70° C. for 3 hours. The mixture was cooled, poured into a 250-ml separatory funnel, and washed twice with about 100 ml of distilled water to remove zinc chloride. The funnel was allowed to stand overnight to separate the emulsion. The organic layer was drained and dried over anhydrous sodium sulfate then filtered. The solution was poured into a polypropylene beaker and placed onto a warm hot plate. When the bulk of the solvent had evaporated, the beaker and copolymer were placed in a vacuum oven at 60° C. and 9 torr and dried over 20 hours to constant weight. A total of 12.5 g (31% yield) of poly(1-hexene-co-methyl acrylate) was recovered.

Sealed Tube Method. To a stirred solution of 14.3 g (0.105 moles) of zinc chloride dissolved in 40 ml of ethyl acetate was added 11.6 g (0.138 moles) of 1-hexene, 6.0 g (0.07 moles) of methyl acrylate, and 0.088 g of benzoyl peroxide (0.5 weight percent of comonomers). Equal amounts of the resulting mixture were added to two thick-walled 30-ml polymerization tubes and purged with nitrogen. The tubes were sealed and heated at 80° C. for 24 hours. The resulting copolymer solution was cooled and transferred to separatory funnel. The tube was rinsed with additional ethyl acetate (ca. 20 ml), which was also transferred to the funnel. The solution was washed twice with 40 ml of deionized water to remove zinc chloride. The organic layer was dried over sodium sulfate, filtered, and the solvent evaporated in a vacuum oven to yield 6.08 g (52% yield) of poly(1-hexene-co-methyl acrylate).

Esterification of Ethylene-Acrylic Elastomers. Twenty grams of Vamac G were dissolved in 125 ml of toluene and added to a 250 mL three-necked, round bottomed flask containing a magnetic stir bar. To the mixture was added 0.2 g of methanesulfonic acid and 16 g of n-butanol. A condenser with Dean-Stark trap and a thermocouple were fitted to the flask. The mixture was refluxed for 12 hours, during which time IR spectra taken periodically to chart the disappearance of the carboxylic acid's —OH peak. The mixture was cooled and the polymer precipitated in about 600 mL of methanol. The polymer was placed in a dish and dried overnight in a vacuum oven at 60° C. About 13 g were isolated. Spectroscopic analysis showed the compound to be a terpolymer of ethylene-methyl acrylate and N-butyl acrylate.

EXAMPLE 2

Characterization of Hexene/Methyl Acrylate Copolymers

This example was performed for the purpose of characterizing, using analytical techniques, the hexene/methyl acrylate copolymer toughening additive formed using the inventive process. The isolated copolymers were characterized by $^1$H NMR spectroscopy and size exclusion chromatography and were determined to be copolymers of the reactants, as opposed to homopolymer blends. This was confirmed further by solubility tests and by the fact that hexene does not polymerize under these reaction conditions. The inventive copolymer toughening additives were completely soluble in non-solvents of poly(1-hexene), e.g. ethyl acetate and acetone, and insoluble in solvents of poly(1-hexene), e.g. hexane and cyclohexane. Table 1 below shows the characterization and composition of hexene/methyl acrylate copolymers which were synthesized by the sealed tube method in Example 1.

TABLE 1

Characterization and Composition of Hexene/Methyl Acrylate Copolymers

| Copolymer sample # | [ZnCl$_2$]/ [MA] feed | [Hex]/ [MA] feed | [Hex]/ [MA] copolymer | Mn (PMMA) | MWD | CH/O |
|---|---|---|---|---|---|---|
| 1 | 0 | 1 | 0.21 | 15,900 | 2.7 | 2.2 |
| 2 | 1 | 1 | 0.27 | 17,600 | 2.1 | 2.4 |
| 3 | 1 | 2 | 0.46 | 12,700 | 2.3 | 2.9 |
| 4 | 1 | 3 | 0.42 | 12,400 | 1.8 | 2.8 |
| 5 | 1.5 | 2 | 0.50 | 13,600 | 2.1 | 3.0 |
| Vamac G | | | | 60,800 | 4.8 | 4.3 |

The level of hexene incorporated into the copolymer was determined from the integral ratio of the methyl group signals of hexene and methyl acrylate, $\delta_{0.9}/\delta_{3.7}$, in the NMR spectrum, which provides the mole ratio of the two comonomers directly, i.e. [Hex]/[MA]. Molecular weight measurements were determined relative to PMMA standards. The molecular weight ratio of hydrocarbon to oxygen in the copolymer (CH/O) is an arbitrary but convenient index of the degree of incorporation of olefin into the copolymer toughening additive product. The CH/O value for Vamac G is approximately 4.3 and the corresponding value for poly (methyl acrylate)homopolymer is 1.7. The CH/O value for poly(1-hexene) is undefined since it does not contain oxygen.

Referring now to samples 3 and 5 of Table 1, which were synthesized using the sealed tube method, it is clear from sample 5 that inclusion of a greater than equimolar amount of ZnCl$_2$ (a Lewis acid) per mole of methyl acrylate results in a desirably higher mole ratio of hexene to methyl acrylate in the copolymer reaction product, as compared to sample 3 where an equimolar amount of the halide per mole of methyl acrylate is used: For both samples 3 and 5, the ratio of hexene to methyl acrylate in the feed was 2.0. There is a clear correlation between the amount of ZnCl$_2$ added to the reaction and the amount of olefin incorporated into the copolymer formed. In particular, the data from Table 1 shows that olefin content in the copolymer increases with increasing concentrations of ZnCl$_2$.

EXAMPLE 3

Copolymerization of Norbornene and Methyl Acrylate

In this example, norbornene is copolymerized with methyl acrylate, using ZnCl$_2$ as the Lewis acid to produce copolymers having random, alternating or block structures incorporating units derived from norbornene and methyl acrylate. For example, the scheme below shows the structure of a perfectly alternating copolymer of norbornene and methyl acrylate.

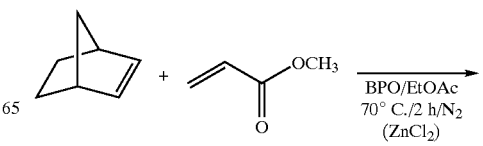

-continued

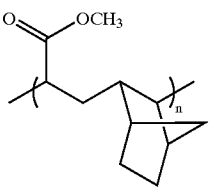

A series of poly(norbornene-co methyl acrylates) were synthesized by heating solutions of norbornene and methyl acrylate in ethyl acetate for two hours at 70° C., according to the stirred reactor procedure described in Example 1. In all cases equimolar amounts of the two comonomers were employed. The reaction was performed under conditions of varying concentrations of zinc chloride in order to produce copolymers with different compositions. The results are presented in Table 2.

TABLE 2

Copolymerization of Norbornene and Methyl Acrylate

| Sample | [ZnCl2]/[MA] | Yield (%) | Mn (PMMA) | MWD | [NB]/[MA] | CH/O |
|---|---|---|---|---|---|---|
| N1 | 0 | 44 | 37,000 | 3.1 | 0.38 | 2.8 |
| N2 | 0 | 42 | 36,000 | 2.8 | 0.37 | 2.8 |
| N3 | 0.5 | 47 | 54,000 | 2.3 | 0.62 | 3.5 |
| N4 | 1.0 | 37 | — | — | 0.78 | 4.0 |
| N5 | 2.0 | 34 | 35,000 | 1.7 | 0.85 | 4.2 |
| N6 | 2.5 | 45 | — | — | 0.95 | 4.5 |
| Vamac G | | | 60,000 | 3.8 | | 4.3 |

Referring now to Table 2, which shows the characterization and composition of copolymers formed from norbornene and methyl acrylate using the stirred reactor method, it can be seen that the amount of norbornene incorporated into the copolymer increases linearly with increasing concentrations of $ZnCl_2$ in the feed. The data presented graphically in FIG. 1 shows that there is a good correlation between the concentration of $ZnCl_2$ in the reaction mixture and the concentration of norbornene incorporated into the copolymer for molar ratios of $ZnCl_2$ to methyl acrylate up to 2.5. The continuous line in FIG. 1 is the data plotted from the least squares method. When 2.5 moles of $ZnCl_2$ per mole of methyl acrylate is used, a copolymer (N6) containing a molar ratio of norbornene to methyl acrylate [NB]/[MA] of almost 1:1 is formed, as determined from the $^1H$ NMR spectrum.

Vamac G, a commercially available toughening agent, is included in Table 2 for comparative purposes. Molecular weights ($M_n$) and distributions (MWD) were lower than those recorded for the commercial ethylene-methyl acrylate copolymer, Vamac G. The CH/O index, which provides an index of the degree of incorporation of olefin into the copolymer and permits comparisons to be made between different olefin-acrylate copolymers, indicates that sample N6 has a CH/O index which exceeds that of Vamac G, a commercially available toughening agent.

EXAMPLE 4

Dynamic Mechanical Analysis

Toughening particles dispersed in polymeric adhesives are typically about 0.5 to 5 μm in diameter and are present at a volume fraction of about 5 to 30%. Dynamic mechanical analysis (DMA) represents one of the best methods for detecting the presence of a dispersed phase of toughening particles in an adhesive or polymeric matrix. In such cases, the dispersed phase is indicated by the presence of one or more secondary transitions in the DMA plots of elastic modulus (G'), loss modulus (G") or damping (G"/G', also defined as tan δ) versus temperature.

Cyanoacrylate (CA) adhesive formulations were prepared for DMA testing by dissolving the copolymers in ethyl 2-cyanoacrylate containing 25 ppm $BF_3$ as stabilizer. The formulae were sensitized for photocuring by the addition of 1% Irgacure 1700 (supplied by Ciba Geigy) and 130 ppm ferrocene. Films of the cured adhesive were prepared between two release treated overlapping glass slides. The slide assemblies were filled with the sensitized liquid formulation by capillary action while a gap of 1 mm was maintained by means of a spacer located at one end of each assembly. The filled assemblies were exposed to ultraviolet (UV) light from an Oriel Corp. Model 87331 mercury arc lamp projector (1 8 $J/cm^2$/side) to cure the adhesive. After curing, the films were removed from the glass plates by immersing the assemblies in warm water for a few minutes. The free films were then dried to constant weight and cut to the required dimensions. This method provided highly uniform defect-free cyanoacrylate polymer films.

DMA were performed on a Rheometrics RDAII in torsional shear mode at a frequency of 10 rad/s (~1.6 Hz). The analyses were conducted over the temperature range −120 to +150° C. Cyanoacrylate adhesives containing copolymer samples #1, #2 of Example 3 and #N2 of Example 4 were tested. For comparative purposes, films of unmodified UV cured poly(ethyl 2-cyanoacrylate) (PECA) and PECA toughened with Vamac G were also examined. The results are presented in FIGS. 2–6.

Figure 2:
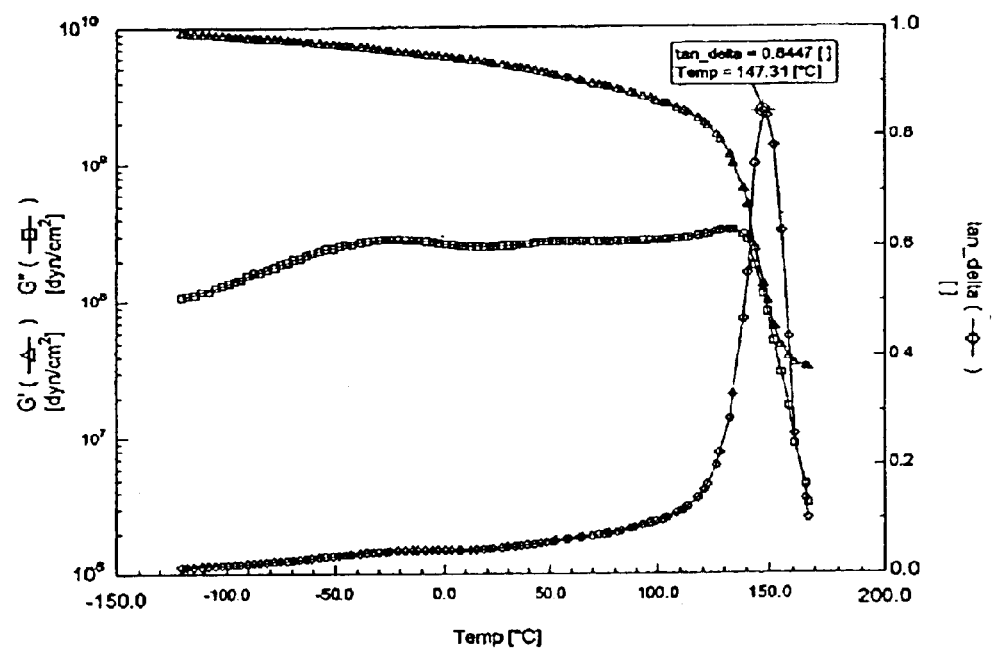
FIG. 2 is a dynamic mechanical analysis (DMA) trace of photocured poly(ethyl 2-cyanoacrylate)(PECA) without a copolymer toughening agent.
Figure 3:
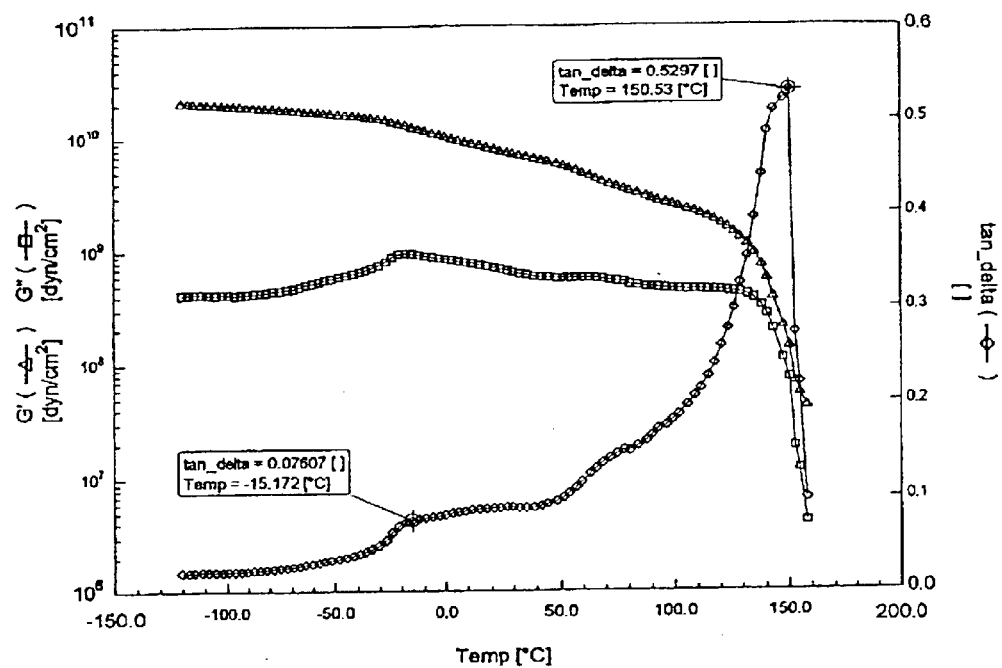
FIG. 3 is a DMA trace of photocured PECA containing 7.5% Vamac G, a commercially available toughening additive.

Referring to FIG. 2, which shows the trace for UV cured PECA without added toughening agent, a single α-transition at 147° C. is observed in the tan δ plot corresponding to the glass transition ($T_g$) for the polymer. Above $T_g$, the polymer rapidly decomposes. In contrast, the DMA traces of the cured material containing 7.5% by weight Vamac G (FIG. 3), show a weak β-transition (secondary transition) at −15° C. in the tan δ plot and an associated reduction in the elastic modulus (G'). This transition corresponds to the Tg of the added elastomer, which has phase-separated from the CA polymer. The main transition is still observed at approximately 150° C. indicating that there is little plasticization of the CA by the added copolymer, which provides additional evidence, that phase segregation has occurred. The film broke before the α-transition was completely defined. This is frequently observed with CA samples since the onset of degradation occurs almost immediately after the polymer becomes rubbery.

FIG. 4 shows the DMA traces corresponding to the PECA film containing 5% hexene/methyl acrylate copolymer sample #2 (Table 2, Example 3), which has a hexene/methyl acrylate mole ratio of 0.27. This trace clearly shows a β-transition at about 9° C. corresponding to the phase separated rubber. The corresponding modulus drop is approximately the same magnitude as that observed with Vamac G, indicating a comparable degree of phase separation. In addition the α-transition, at 149° C., is essentially unchanged from that of the unmodified CA polymer (FIG. 2), indicating that there is little or no plasticization of the CA polymer. Thus Vamac G and hexene/methyl acrylate copolymer #2 are similar with respect to their insolubility in PECA and may be expected to impart similar degrees of toughness to the cyanoacrylate polymer.

In contrast, the CA film containing copolymer #1, having a lower mole ratio of hexene/methyl acrylate ([Hex]/[MA]=

0.21), does not show a distinct β-transition and the value of the α-transition is lowered compared to that of the unmodified polymer, as shown in FIG. 5.

This suggests that there is a threshold concentration of hexene in the copolymer (between mole ratio hexene/MA 0.21–0.27), above which phase separation occurs and below which plasticization is prevalent. DMA was also performed on a photocured ECA film containing poly(norbornene-co-methyl acrylate), having a N/MA ratio of 0.37 (FIG. 6). This film exhibits a primary transition due to the CA polymer at 146° C., which is close to the value observed for unmodified PECA (FIG. 2). A secondary transition appears as a shoulder at approximately 96° C., which is not observed in scans of unmodified PECA. This is likely due to the $T_g$ of the phase-separated copolymer. The relative size of this shoulder compared to the alpha transition indicates a high degree of toughening potential for the copolymer, although the relatively high $T_g$ may restrict its benefit to a narrow temperature range of use in CA's in the region 90–150° C. A less well-defined γ-transition is also observed at 17° C.

EXAMPLE 5

Stability Tests and Fixture-Time Tests of Toughened CA Adhesives.

The olefin/alkyl (meth)acrylate copolymers prepared as described in Example 1 are neutral with regard to their influence on the reactivity and stability of cyanoacrylate monomers. Compositions for stability and reactivity testing were prepared by dissolving 8% copolymer in ethyl 2-cyanoacrylate (ECA) containing 25 ppm of boron trifluoride. Stability was determined by the length of time that the formulated product remained in a liquid and useable state under ambient storage conditions in a polyethylene container. Adhesives containing the inventive hexene/methyl acrylate copolymer #5 and norbornene/methyl acrylate copolymer #N2 additives, respectively, were selected, as well as two commercially available ethylene/methyl acrylate elastomers, Vamac G and Vamac D, which were chosen for comparative purposes. The stability test results are presented in Table 3.

TABLE 3

Stability of Toughened Cyanoacrylate Adhesives Under Ambient Storage Conditions

| Copolymer Sample # | Stability (months) |
| --- | --- |
| none | >6 |
| Hexene/methyl acrylate #5 | >6 |
| Norbornene/methyl acrylate #N2 | >6 |
| Vamac G | >6 |
| Vamac D | 0 |

The data show that the inventive copolymers #5 and #N2 provide stable liquid adhesive compositions for periods exceeding 6 months, as does the commercial material Vamac G. However, the related material, Vamac D, provides unstable adhesives that polymerize in a matter of a few hours, following the dissolution of the copolymer.

The reactivities of the adhesive formulations were determined by measuring the minimum time required to fixture a single-lap shear adhesive joint under static loading of 3 kilograms. The tests were conducted on 1×4 inch², solvent wiped, mild-steel test specimens assembled with an overlap area of 0.5 square inches. The stress was applied to the adhesive for 5 seconds and the assembly was considered fixtured if the specimens did not move relative to one another during that time. Three consecutive replicate measurements were made and the minimum time range recorded. The results are presented in Table 4.

TABLE 4

Fixture Times of ECA Adhesives Containing Various Copolymers

| Copolymer Sample # | Sample Age (months) | Fixture-Time (seconds) |
| --- | --- | --- |
| None | 0 | 20–30 |
| Hex/MA #5 | 0 | 20–30 |
| Hex/MA #5 | 11 | 20–30 |
| Norb/MA #N2 | 6 | 10–20 |
| Vamac G | 0 | 90–105 |
| Vamac G | 6 | 210–240 |

Referring to Table 4, the reactivities of adhesives containing copolymers of the present invention were compared with the same formulation containing Vamac G. The data show that the presence of 8% hexene/methyl acrylate has no influence on the reactivity of the monomer. The fixture time is identical to that of the unmodified monomer before and after aging for 11 months under ambient conditions. With norbornene/methyl acrylate, there is a slight activating effect, but since this adhesive formulation has stability in excess of six months, the copolymer is acceptable as an additive for use in cyanoacrylates. In contrast, there is a significant deactivating effect in the composition containing Vamac G. The fixture-time of a freshly prepared adhesive composition is over three times higher than that of the unmodified monomer. In addition, the reactivity is further reduced on storage, such that after six months the fixture time is almost an order of magnitude longer than that of the unmodified adhesive. This material is clearly undesirable for use as an additive of cyanoacrylate adhesives. In contrast the copolymers of the present invention represent a marked improvement over commercial toughening agents in terms of both fixture time and stability.

EXAMPLE 6

Esterification of Olefin/Alkyl (Meth)Acrylate Copolymers

This example demonstrates:

(1) that the fixture time of cyanoacrylate compositions containing commercially available copolymer toughening additives such as Vamac G are significantly longer than those same compositions containing one of the inventive copolymer toughening additives of the present invention which was prepared by an esterification of the Vamac G. This is believed to be due to the acidic functionality and/or impurity present in these commercial copolymer additives as a result of their method of preparation For example, elimination of the acidic functionality and/or impurities responsible for such slow fixture times by using an esterification process of the present invention to butylate the Vamac G copolymer, resulted in improved fixture times (70–90 seconds) which were two to three times faster than an unmodified Vamac G copolymer (150–180 seconds) in a test composition.

(2) a process for converting a copolymer unsuitable for use as a toughening additive in cyanoacrylate adhesives into a copolymer useful as a toughener in cyanoacrylate adhesives by elimination of the acid functionalities therein which affect the reactivity of the cyanoacrylate monomer. In particular, the process is for esterification of an olefin/(meth)acrylate copolymer or an olefin/alkenoic acid copolymer containing carboxylic acid functionalities, which process includes reacting the copolymer with an alcohol in the presence of a catalytically effective amount of an acid catalyst, at a temperature of about 50 to about 180° C. and in the presence of a solvent suitable for esterification for a time sufficient to allow conversion of the carboxylic acid functionalities into esters. The process further includes substantial removal of the acid catalyst by precipitating the copolymer in a solvent in which the catalyst is soluble, but the copolymer is insoluble.

Certain commercially available olefin-acrylate elastomers, such as Vamac G, may be used to toughen cyanoacrylate adhesives. However, these products have the undesirable effect of slowing the cure speed as a consequence of the presence of a low concentration of free carboxylic acid groups present in the copolymer. In order to overcome this limitation, we esterified Vamac G to eliminate the free carboxylic acid functionality.

Vamac G was successfully esterified with excess n-butanol in the presence of methane sulfonic acid (MSA) as catalyst to provide the corresponding ethylene-methyl acrylate-butyl acrylate terpolymer using the scheme below. The product was isolated by precipitation in methanol and drying to constant weight. This has the effect of purifying the copolymer such that the acid catalyst is substantially removed from it.

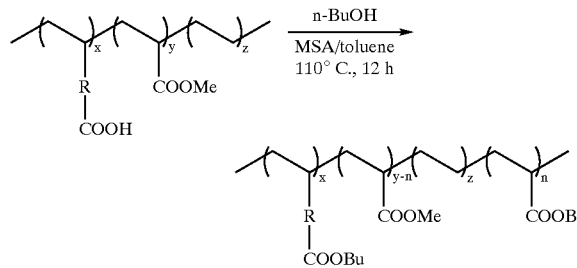

Infrared analysis of the starting Vamac G polymer shows a broad absorption band at 3265 cm$^{-1}$ characteristic of a carboxylic acid group. This absorption band is absent in the spectrum of the product indicating that esterification is essentially complete. Acid analysis of the new material was 3.8 mg KOH/g, which represents a significant reduction from the 21.1 value of the starting Vamac G. It confirms that the esterification is essentially complete and that the acid added to catalyze the esterification reaction was effectively removed during the precipitation of the copolymer. Proton NMR analysis confirmed the presence of a partially butylated structure and showed that the degree of butylation was in the range of 16–21% of total ester content. This indicates that significant transesterification has also occurred under the above conditions where x+n=~y/5 in this scheme. Attempts to esterify the elastomer with excess methanol by this method were unsuccessful.

A test formulation was prepared by dissolving 8% by weight of the butylated Vamac in ethyl 2-cyanoacrylate, which contained 50 ppm methanesulfonic acid as stabilizer. A similar composition containing 8% unmodified Vamac G was also prepared for comparative purposes. The adhesive fixture times were determined as described in Example 6 and the results are presented in Table 5.

TABLE 5

Comparative Fixture Times of ECA Adhesives Containing Butylated Vamac G and Unmodified Vamac G

| Toughening Agent | Fixture time (seconds) |
|---|---|
| Butylated Vamac G | 75–90 |
| Vamac G | 150–180 |

EXAMPLE 7

Fracture Toughness Test

This example demonstrates that the olefin-acrylate copolymers of the present invention are capable of toughening cyanoacrylate adhesives.

A sample of poly(1-hexene-co-methyl acrylate) containing 25 mole % hexene was prepared according to the stirred reactor method described in Example 1. Ultra-violet light (UV) curable adhesive formulations were prepared by blending together the material components listed in Table 6.

TABLE 6

Formulations of UV-Curable Cyanoacrylate Adhesives

| Component | Formula A weight % | Formula B weight % |
|---|---|---|
| Ethyl 2-cyanoacrylate | 94.984 | 98.984 |
| Poly(1-hexene-co-methyl acrylate) | 4.000 | 0 |
| Irgacure 1700 | 1.000 | 1.000 |
| Ferrocene | 0.013 | 0.013 |
| Boron trifluoride | 0.003 | 0.0003 |

Photocured films of each formulation were prepared according to the procedure already described in (Example 4). The films were cut and machined into standard sized fracture test specimens and tested for fracture toughness according to ASTM E813-89, Standard Test Method for $J_{IC}$, a Measure of Fracture Toughness. The results are presented in Table 7.

TABLE 7

Fracture Toughness and Failure Modes for Cyanoacrylate Adhesives

| Formulation | Fracture Toughness Energy Release Rate lbs/in | Mode of Failure |
|---|---|---|
| A | 10.7 (±1.7) ($J_q$) | Ductile |
| B | 1.5 (±0.4) ($G_q$) | Brittle |

Formulation A, containing a small amount of olefin-acrylate copolymer is representative of the present invention, whereas formulation B is included for comparative purposes. It does not contain any copolymer. The results clearly show a significant improvement in fracture toughness of formulation A compared to formulation B. The improved toughness resulting from the presence of the copolymer is further confirmed by the mode of failure. When copolymer is present, the failure occurs in a ductile mode, whereas brittle failure is observed when the copolymer is omitted.

The invention being thus described, it will be evident to those skilled in the art that the same may be varied in many ways. Such variations are not to be regarded as a departure from the spirit and scope of the invention and all such modifications are intended to be defined by the claims.

What is claimed:

1. A toughened cyanoacrylate adhesive composition substantially free of acidic or basic impurities comprising:
   (i) at least one cyanoacrylate monomer
   (ii) an elastomeric copolymer toughening additive substantially soluble in said cyanoacrylate monomer, said copolymer being the reaction product of an olefin $C_{2-20}$ and a (meth)acrylate ester and being substantially free of acidic functionalities and acidic or basic impurities, wherein said olefin $C_{2-20}$ has at least six carbon atoms.

2. The composition of claim 1 wherein said cyanoacrylate monomer comprises at least one of formulas (1), (2) or (3):

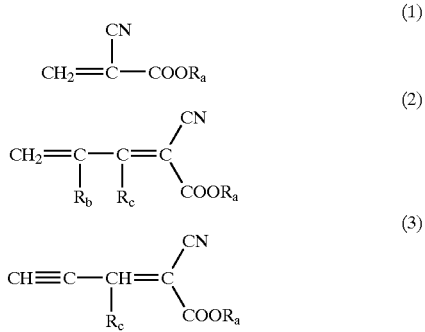

wherein $R_a$ represents a $C_1$ to $C_{16}$ alkyl, alkoxyalkyl, alkylhalide, alkenyl, cyclohexyl, phenyl or furfuryl group; $R_b$ is hydrogen, a $C_{1-5}$ alkyl, phenyl or halogen and $R_c$ is hydrogen or methyl.

3. The composition of claim 1 wherein said olefin $C_{2-20}$ comprises

wherein $R_3$ is H, $C_1$–$C_{10}$ alkyl, cycloalkyl, alkyl ether, substituted or unsubstituted, linear or branched; X is O, S or —(CH$_2$)$_n$—; provided that $R_3$ does not adversely affect the reactivity of said cyanoacrylate monomer.

4. The composition of claim 1 wherein said (meth)acrylate ester has the formula (7):

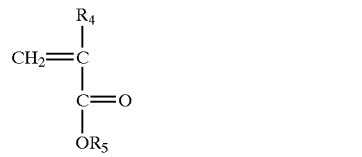

wherein $R_4$ is H or $CH_3$ and $R_5$ is $C_1$–$C_{18}$ alkyl, cycloalkyl, alkyl ether, aryl, alkaryl, substituted or unsubstituted, linear or branched, with the proviso that substituents $R_4$ and $R_5$ do not adversely affect the reactivity of said cyanoacrylate monomer.

5. The composition of claim 1 wherein said olefin $C_{2-20}$ is 1-hexene.

6. The composition of claim 1 wherein said olefin $C_{2-20}$ is norbornene.

7. The composition of claim 1 wherein said copolymer is the reaction product of 1-hexene and methyl acrylate.

8. The composition of claim 1 wherein said copolymer is the reaction product of norbornene and methyl acrylate.

9. The composition of claim 1 wherein upon cure of said cyanoacrylate monomer said copolymer undergoes a phase separation therefrom.

10. The composition of claim 1 wherein said copolymer is present in a concentration range of about 0.5 to about 20% by weight of the adhesive composition.

11. The composition of claim 1 wherein said copolymer is present in a concentration range of about 1.5 to about 15% by weight of the composition.

12. The composition of claim 1 wherein said copolymer is present in a concentration range of about 5 to about 15% by weight of the composition.

13. The composition of claim 1 further comprising an inhibitor of anionic polymerization.

14. The composition of claim 13 wherein said inhibitor of anionic polymerization is selected from the group consisting of sulfur dioxide, sulfur trioxide, nitric oxide, hydrogen fluoride, organic sultone inhibitors, boron trifluoride, methane sulfonic acid and combinations thereof.

15. The composition of claim 13 wherein said inhibitor of anionic polymerization is present at about 0.0001 to about 0.1% by weight of said adhesive composition.

16. The composition of claim 1 further comprising an inhibitor of free-radical polymerization.

17. The composition of claim 16 wherein said inhibitor of free-radical polymerization is a hydroquinone or quinone.

18. The composition of claim 16 wherein said inhibitor of free-radical polymerization is present at about 0.0005 to about 10% by weight of said adhesive composition.

19. A composition substantially free of acidic or basic impurities useful for toughening adhesives, comprising the reaction product of an olefin $C_{2-20}$ and a (meth)acrylate ester, said reaction product being substantially free of acidic functionalities and acidic or basic impurities, wherein said olefin $C_{2-20}$ has at least six carbon atoms.

20. The composition of claim 19 wherein the olefin $C_{2-20}$ comprises

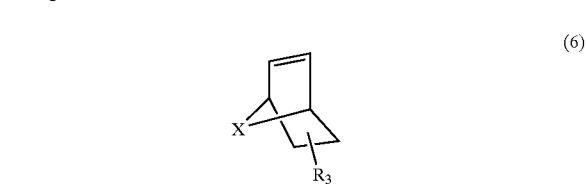

wherein $R_3$ is H, $C_1$–$C_{10}$ alkyl, cycloalkyl, alkyl ether, substituted or unsubstituted, linear or branched; X is O, S or —(CH$_2$)$_n$—; with the proviso that $R_3$ does not adversely affect the reactivity of a cyanoacrylate monomer.

21. The composition of claim 19 wherein the (meth)acrylate has the formula 7:

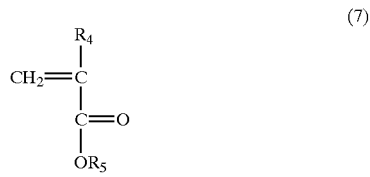

wherein $R_4$ is H or $CH_3$ and $R_5$ is $C_1$–$C_{18}$ alkyl, cycloalkyl, alkyl ether, aryl, alkaryl, substituted or unsubstituted, linear or branched, with the proviso that substituents $R_4$ and $R_5$ do not adversely affect the reactivity of a cyanoacrylate monomer.

22. The composition of claim 19 wherein said olefin $C_{2-20}$ is 1-hexene.

23. The composition of claim 19 wherein said olefin $C_{2-20}$ is norbornene.

24. The composition of claim 19 wherein said composition is the reaction product of 1-hexene and methyl acrylate.

25. The composition of claim 19 wherein said composition is the reaction product of norbornene and methyl acrylate.

26. The composition of claim 19 wherein said composition is at least partially soluble in a cyanoacrylate monomer.

27. A process for preparing a curable toughened cyanoacrylate adhesive composition, said composition comprising at least one cyanoacrylate monomer and a copolymer toughening additive substantially free of acidic functionally and acidic or basic impurities and soluble in said cyanoacrylate monomer, said copolymer toughening additive being substantially free of acidic functionalities and acidic or basic impurities and being the reaction product of a (meth)acrylate ester and an olefin $C_{2-20}$, said process comprising the steps of:

(a) combining said cyanoacrylate monomer with said copolymer toughening additive; and (b) subjecting said combined ingredients to conditions sufficient to allow said cyanoacrylate monomer to substantially solvate said copolymer.

28. A process for copolymerizing a (meth)acrylic ester with an olefin $C_{2-20}$, wherein said olefin $C_{2-20}$ has at least six carbon atoms the copolymerized product being substantially free of acidic functionality and acidic or basic impurities, said process comprising the steps of:

(a) admixing a (meth)acrylic ester, a greater than equimolar amount of a Lewis acid per mole of said (meth)acrylic ester, a free radical initiator and an olefin $C_{2-20}$ wherein said olefin $C_{2-20}$ has at least six carbon atoms, and (b) heating at a temperature from about 60 to about 80° C. for a time sufficient to permit copolymerization of said ester with said olefin, the mole ratio of said olefin to said (meth)acrylic ester being from about 0.1 to about 10.

29. A process for esterifying an olefin/(meth)acrylate copolymer or olefin/alkenoic acid copolymer, the esterified product being substantially free of acidic functionality and acidic or basic impurities, said process comprising the steps of:

(a) reacting said olefin/(meth)acrylate copolymer or said olefin/alkenoic acid copolymer with an alcohol in the presence of a catalytically effective amount of an acid catalyst at a temperature of about 50 to about 180° C. and in the presence of a solvent which is capable of dissolving said copolymer and which is suitable for esterification processes for a time sufficient to convert carboxylic acid functionalities on said copolymer into ester functionalities; and (b) removing said catalyst from said copolymer following esterification.

30. The process of claim 29 further including the step of removing any acidic or basic impurities.

31. A process for sealing or adhering surfaces which comprises:

(a) applying to at least one of said surfaces the adhesive composition of claim 1; and (b) placing said surfaces in an abutting relationship until said composition has cured.

* * * * *

UNITED STATES PATENT AND TRADEMARK OFFICE
CERTIFICATE OF CORRECTION

PATENT NO. : 6,822,052 B2  
DATED : November 23, 2004  
INVENTOR(S) : Woods et al.

Page 1 of 1

It is certified that error appears in the above-identified patent and that said Letters Patent is hereby corrected as shown below:

Column 5,  
Line 20, the printed patent should read:

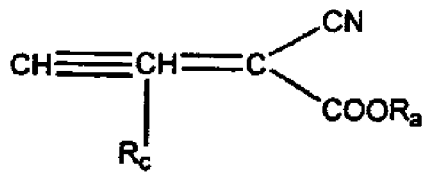

(3)

Column 6,  
Line 59, the printed patent should read -- ..structures shown. However..- --.

Column 18,  
Line 57, the printed patent should read -- ...method of preparation. For example,... --.

Signed and Sealed this

Seventeenth Day of May, 2005

JON W. DUDAS  
*Director of the United States Patent and Trademark Office*